(12) United States Patent
Harmon

(10) Patent No.: US 6,225,790 B1
(45) Date of Patent: May 1, 2001

(54) APPARATUS AND METHOD FOR MOTION-BASED ACTIVATION OF A VOLTAGE REGULATOR

(75) Inventor: Jack Douglas Harmon, Carmel, IN (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/420,981

(22) Filed: Oct. 20, 1999

(51) Int. Cl.$^7$ ............................................. H02P 9/00
(52) U.S. Cl. ............................ 322/28; 322/36; 290/40 A
(58) Field of Search ..................... 290/40 R, 40 A, 290/40 E, 40 F; 322/14, 15, 25, 28, 29

(56) References Cited

U.S. PATENT DOCUMENTS

| | | | |
|---|---|---|---|
| 4,636,705 | * | 1/1987 | Bowman ................................ 322/28 |
| 4,636,706 | * | 1/1987 | Bowman et al. ..................... 322/28 |
| 4,831,322 | * | 5/1989 | Mashino et al. ..................... 322/28 |
| 5,254,936 | * | 10/1993 | Leaf et al. ............................ 322/90 |
| 5,637,986 | * | 6/1997 | Kanazawa et al. .................. 322/28 |
| 5,719,486 | * | 2/1998 | Tagiuchi et al. ..................... 322/28 |
| 6,005,372 | * | 12/1999 | Kouwa et al. ........................ 322/25 |
| 6,014,016 | * | 1/2000 | Maruyama et al. ................. 322/28 |

OTHER PUBLICATIONS

U.S. application Attorney Docket No. DP–300471 entitled "Apparatus and Method for Providing an Output Signal Indicative of Engine Rotational Speed and/or Generator Rotational Speed" filed concurrently with this application.

\* cited by examiner

*Primary Examiner*—Nicholas Ponomarenko
(74) *Attorney, Agent, or Firm*—Margaret A. Dobrowitsky

(57) ABSTRACT

An activation apparatus is provided for motion-based activation of a voltage regulator. Also provided is a method of activating a voltage regulator in a motion-based manner. A motion-responsive element detects motion (e.g., motion, vibration, and/or acceleration) and applies an activation signal to the voltage regulator in response thereto. The voltage regulator becomes activated in response to this signal. Also provided is a charging system containing a voltage regulator that is activated based on motion. Since some voltage regulation units require strobing of the activation signal, the activation apparatus can be provided with strobing circuitry. The strobing circuitry turns the activation signal ON and OFF in a cyclic manner, preferably over for a predetermined duration, according to the needs of the particular voltage regulation unit or a transistor associated therewith that controls the flow of current through a field winding of the charging system's generator.

8 Claims, 1 Drawing Sheet

APPARATUS AND METHOD FOR MOTION-BASED ACTIVATION OF A VOLTAGE REGULATOR

BACKGROUND OF THE INVENTION

1. Field of the Invention

The present invention relates to an apparatus and method for motion-based activation of a voltage regulator. The present invention also relates to a voltage regulator that is activated based on motion, and a charging system containing such a voltage regulator.

2. Discussion of the Related Art

Voltage regulating systems for controlling the field current of a diode-rectified alternating current generator, that supplies the electrical loads on a motor vehicle, are well known to those skilled in the art. One known type of voltage regulator senses the voltage applied to the battery, and if this voltage is higher than a desired regulated value, a transistor that controls field current is switched off. When generator voltage drops below the regulated value, the field controlling transistor is switched on. The transistor is repetitively switched on and off in response to sensed voltage changes to thereby cause the output voltage of the generator to be maintained at a predetermined, desired regulated value.

In another type of known voltage regulator the field current is pulse-width modulated at a constant frequency to maintain the output voltage of the generator at a desired regulated value. The pulse width, in that type of system, is a function of the difference between actual generator output voltage and a desired voltage. Examples of this type of regulator are disclosed in U.S. Pat. No. 2,976,473 to Shaw et al. and U.S. Pat. No. 4,275,344 to Mori et al. British Pat. No. 1,392,096 also discloses pulse-width control of field current, and in that patent, the voltage reference takes the form of a cyclic staircase waveform.

Another example of a voltage regulator that employs pulsewidth modulation of generator field current is disclosed in U.S. Pat. No. 4,636,706 to Bowman et al., the contents of which are incorporated herein by reference. According to Bowman et al., the regulator disclosed in that patent utilizes a digital apparatus that includes an up-down counter which responds to the relative magnitudes of the actual output voltage of the generator and the desired regulated output voltage of the generator. When the actual output voltage of the generator is below the desired regulated value, the counter is incremented or counted up, and when the actual output voltage is above the desired regulated value, the counter is decremented or counted down. The instantaneous count in the counter is used to determine the on time of a semiconductor switch that is connected in series with the field winding of the generator. The instantaneous count thus determines the pulse-width of the voltage that is applied to the field. Whenever actual output voltage exceeds the desired regulated value, the field controlling semiconductor switch is biased off. Thus, during the time that the actual output voltage is above the desired regulated value, the field is not energized and the counter is decremented. When actual output voltage then drops below the desired regulated value, the field is energized at the pulse-width represented by the magnitude of the count in the counter, and the counter is incremented.

Regardless of which type of voltage regulator is implemented, it is desirable to turn off the voltage regulator associated with an engine whenever the engine is not running. This prevents the energy stored in the engine's battery from being drained by the regulator's circuitry.

The voltage regulator, however, must be re-activated when the engine is started (i.e., when the generator begins to turn). One conventional way of re-activating the voltage regulator is to wire a vehicle's ignition switch or other circuitry associated therewith to an activation input terminal (i.e., the lamp input) of the voltage regulator. In particular, this wiring is performed so that the voltage regulator gets "strobed on" by closure of the ignition switch. This wiring arrangement, while generally effective, does require an electrical connection from the ignition switch or its associated circuitry to the voltage regulator. This added connection, however, has some disadvantages. Since it extends out from where the regulator and/or generator are mounted, it remains relatively unprotected and susceptible to damage. It can be inadvertently disconnected, cut, or otherwise rendered inoperative. The soldering techniques that are typically used to effect the added connection also can fail. If any of these things occur, the voltage regulator typically cannot become activated. As a result, no voltage regulation is provided and/or the generator fails to generate current. In the automotive context, this translates into added costs associated with repair and/or warranty work.

There is consequently a need in the art for a method and/or apparatus capable of activating a voltage regulator in such a way that no external connection to an ignition switch is required, thereby reducing the likelihood that the voltage regulator will fail to become activated in response to starting of the engine.

Another conventional technique for activating a voltage regulator avoids the external connection to the ignition switch by using the residual magnetism in the vehicle's generator. In particular, one or more of the phases from the generator is connected to the lamp input (or another suitable input) of the voltage regulator and the residual magnetism from the associated winding is used to activate the voltage regulator when the generator begins to turn. The residual magnetism, however, can dissipate over time (e.g., through diode leakage in the bridge rectifier of the generator). This can result in turn-on problems. Similar problems arise when road salt or other contaminants invade the bridge rectifier of the generator. The residual magnetism-based arrangement therefore tends to be unreliable in some respects. In addition, disassembly of the generator and re-assembly requires the voltage regulator to be "flashed," since there is no residual magnetism left in the windings after re-assembly of the generator. Such an arrangement also requires "flashing" when it is initially assembled.

There is consequently a need in the art for an apparatus and/or method adapted to activate a voltage regulator without requiring a connection to an engine's ignition switch or related components, and also without requiring the presence of residual magnetism in the windings of the generator during an engine start.

SUMMARY OF THE INVENTION

It is a primary object of the present invention to overcome the foregoing problems and/or to satisfy at least one of the aforementioned needs by providing an apparatus and/or method for motion-based activation of a voltage regulator, a voltage regulator that is activated based on motion, and/or a charging system containing such a voltage regulator.

To achieve this and other objects and advantages, the present invention provides an apparatus adapted to activate a voltage regulator in response to motion. The apparatus comprises a motion sensor and motion detection circuitry. The motion sensor is adapted to detect movement indicative of engine starting or indicative of rotation of a generator and is adapted to provide an output signal indicative of the presence of such movement. The motion detection circuitry is connected to the output signal from the motion sensor and is adapted to apply an activation signal to an activation input of a voltage regulator whenever the output signal from the motion sensor indicates the presence of that movement.

The present invention also provides a method for motion-based activation of a voltage regulator. The method comprises the steps of detecting whether a movement indicative of engine starting or generator rotation is present, and applying an activation signal to a voltage regulator when that movement is present during the detecting step.

Also provided by the present invention is a voltage regulator comprising a voltage regulation unit and an activation apparatus. The voltage regulation unit is adapted to control a field current of a current generator. The voltage regulation unit has an activation input adapted to receive an activation signal to activate the voltage regulation unit in response thereto. The activation apparatus is adapted to activate the voltage regulation unit in response to motion, by applying the activation signal to the activation input whenever movement indicative of engine starting or indicative of rotation of a generator is present.

The present invention also provides a charging system comprising a generator, a voltage regulator, and an activation apparatus. The generator is capable of generating an output current. The generator has field windings that excite other windings of the generator when the output current is to be generated. The voltage regulator is adapted to control a field current applied to the field windings, to thereby control the output current. The voltage regulator has an activation input adapted to receive an activation signal to commence the control of the field current. The activation apparatus is adapted to activate the voltage regulator in response to motion, by applying the activation signal to the activation input whenever movement indicative of engine starting or indicative of rotation of the generator is present.

The present invention thus can be used to circumvent the typical need in the voltage regulator art, for an electrical connection to an engine's ignition switch or related components, or for the presence of residual magnetism in the windings of the generator during an engine start.

Still other objects, advantages, and features of the present invention will become more readily apparent when reference is made to the accompanying drawing and the associated description contained herein.

DESCRIPTION OF PREFERRED EMBODIMENTS

Figure 1:
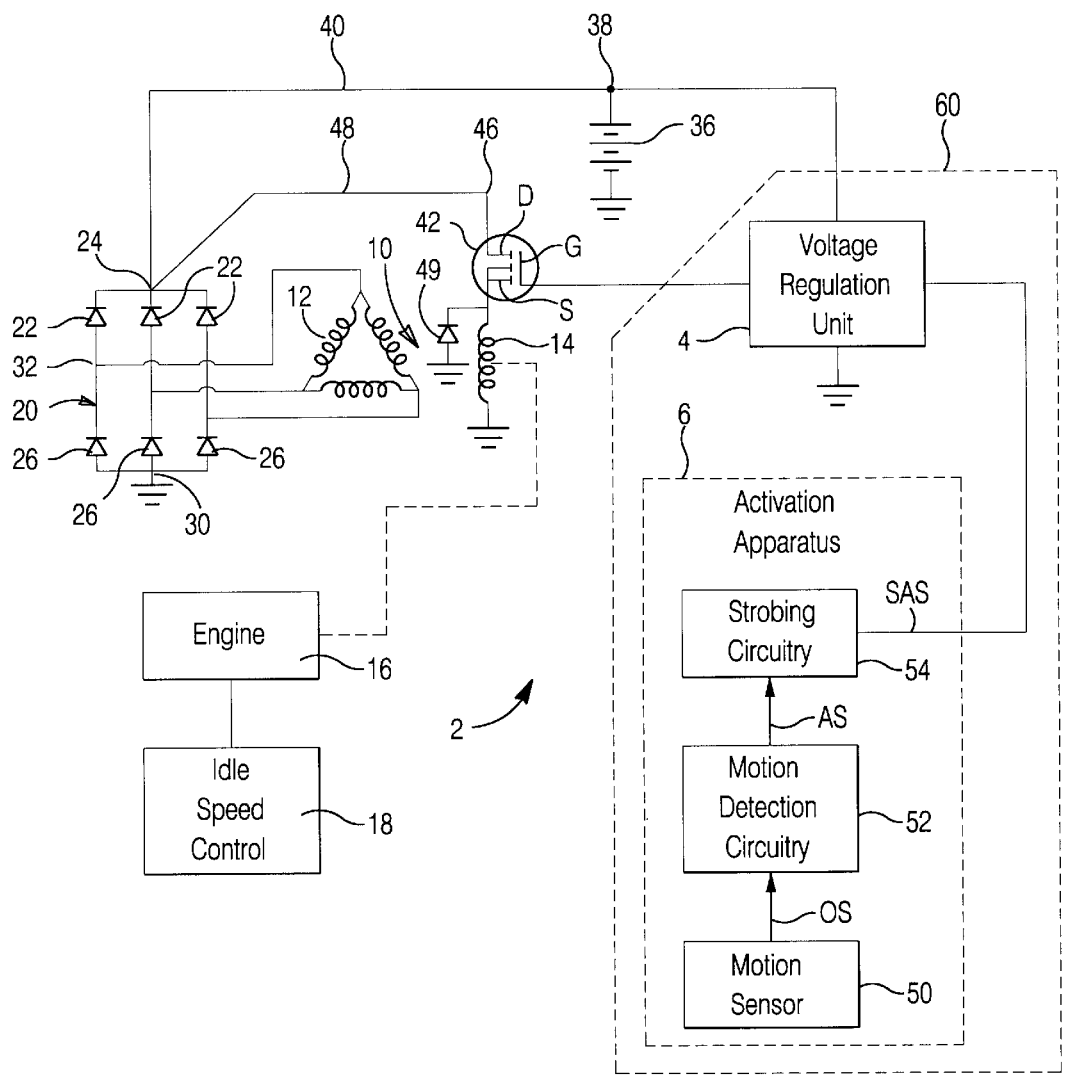
FIG. 1 is a block diagram of a charging system that includes an activation apparatus according to a preferred embodiment of the present invention.

FIG. 1 illustrates a motor vehicle electrical charging system 2 according to a preferred embodiment of the present invention. The charging system 2 includes a voltage regulation unit 4 and an activation apparatus 6 which is adapted to activate the voltage regulation unit 4 in a manner to be described hereinafter. The charging system 2 also has an alternating current generator 10. This alternating current generator 10 has a three phase Delta-connected stator winding 12 and a rotatable field winding 14. The generator 10 may be of the type disclosed in the U.S. Pat. No. 3,538,362 to Cheetham et al. with the exception that the generator in FIG. 1 has a Delta-connected stator winding rather than the Y-connected stator winding shown the Cheetham et al. patent. It will be understood, however, that the voltage regulation unit 4 and activation apparatus 6 of this invention can be used with generators that have either Delta or Y-connected stator windings.

The field winding 14 is part of a rotor assembly which is rotatably driven by the engine 16 of a motor vehicle. The engine 16 is shown connected to an idle speed control 18 which controls the idle speed of the engine 16. The generator 10 typically is driven at a higher speed than the speed of the engine 16 by a belt and pulleys in a well known manner.

The output terminals of the three phase stator winding 12 are connected respectively to AC input terminals of a three-phase full-wave bridge rectifier generally designated by reference numeral 20. The bridge rectifier 20 includes three positive semiconductor diodes 22 which have their cathodes connected to a direct voltage output terminal 24. The bridge rectifier 20 also has three negative semiconductor diodes 26, the anodes of which are connected to a grounded direct current output terminal 30 of the bridge rectifier 20. The junction 32 that is connected between a pair of positive and negative diodes can be connected to the voltage regulation unit 4. The voltage that is developed at junction 32 is a pulsating voltage, and the frequency of the voltage pulses developed at this junction 32 is a function of generator and engine speed. When the generator is not rotating, it does not generate an output voltage and the voltage at junction 32 is zero.

The signal at junction 32 therefore represents generator and engine speed and also indicates whether or not the generator is rotating but only if there is residual magnetism in the generator or if the voltage regulator 4 has been otherwise activated so that current flows through the field winding 14. While this signal at junction 32 can be utilized to control the voltage regulation unit 4 in the manner described in U.S. Pat. No. 4,636,706 to Bowman et al., it preferably is not used in that manner. Instead, the battery voltage on line 40 can be appropriately filtered to determine engine speed based on the frequency of the voltage ripple that appears on line 40 as a result of the output from the generator 10 via the rectifier 20. This approach advantageously avoids the need for a direct connection between the junction 32 and the voltage regulator 4, and thereby avoids any repair or warranty costs associated with failure of this connection or the structure that permits this connection to be made.

Connected to the charging system 2 is a storage battery 36. The negative side of the storage battery 36 is grounded and the positive side of the battery 36 is connected to junction 38. The battery 36 will be assumed to be a 12 volt storage battery in the description of this invention, though it is understood that the invention is not limited in this regard. The battery 36 is charged by a circuit that includes the conductor 40 that connects the direct voltage output terminal 24 of the bridge rectifier 20 to the junction 38. The battery 36 and generator 10 feed various electrical loads on the motor vehicle, which have not been illustrated but which are electrically connected between junction 38 and ground.

The voltage regulation unit 4 controls the current through field winding 14 to regulate the voltage appearing between junction 38 and ground to a desired regulated value. In describing this invention it will be assumed that the system is a 12 volt system and that the desired regulated voltage that is to be maintained between junction 38 and ground is about 14 volts. This desired regulated voltage typically will vary with temperature. Though the foregoing exemplary voltages (i.e., 12 and 14 volts) are used in most of the preferred implementations, it is understood that the invention may be practiced using different voltages.

The current through field winding 14 is controlled by a semiconductor switching device which takes the form of a metal oxide semiconductor field effect transistor 42. This transistor is an N-channel enhancement mode type of transistor. The transistor 42 has a gate G connected to conductor 44, a drain D connected to junction 46 and a source S connected to one side of field winding 14. The opposite side of field winding 14 is connected to ground. The junction 46 is connected to the positive direct voltage output terminal 24 of the bridge rectifier 20 via conductor 48. A field discharge diode 49 is connected across field winding 14.

When the transistor 42 is biased conductive, between its drain D and source S, the field winding 14 will be energized via a circuit that can be traced from the positive direct voltage output terminal 24, through conductor 48 to junction 46, through the drain D and source S electrodes of transistor 42 and then through the field winding 14 to ground. The transistor 42 is switched on and off, in a manner known in the art, in order to maintain the voltage at junction 38 at the desired regulated value which has been assumed to be about 14 volts. The field winding 14 also can be energized from battery 36 via conductors 40 and 48 and transistor 42.

Since the voltage regulation unit 4 consumes some energy, it typically is turned-off when the engine 16 is turned off. This prevents the battery 36 from being drained by the voltage regulation unit 4, especially if the engine 16 remains off for a long period of time. As long as the engine 16 remains off, the voltage regulation unit 4 remains off. When the engine 16 is to be restarted, there is consequently a need to activate the voltage regulation unit 4. Prior art arrangements use a connection from one or more of the stator windings 12 to activate the voltage regulation unit 4 using residual magnetism in the stator windings 12 or use a connection from the ignition switch of the vehicle to activate the voltage regulation unit 4. As indicated above, however, those arrangement suffer from certain disadvantages. The illustrated charging system 2 avoids those disadvantages by providing the activation apparatus 6.

As will be described hereinafter, the exemplary activation apparatus 6 requires no external electrical connections that are not already present at the voltage regulation unit 4. It also does not require external electrical connections that are not already present at the generator 10. The exemplary activation apparatus 6 therefore can be integrated into the voltage regulation unit 4 and/or generator 10. An integrated unit may be preferred since it makes protection of the electrical connection between the voltage regulation unit 4 and the activation apparatus 6 more economical and minimizes the likelihood of failure of such connections and any repair or warranty costs associated therewith. The activation apparatus 6 alternatively can be implemented as a separate unit from the voltage regulation unit 4 and/or generator 10, if such a design is deemed acceptable or more desirable.

The activation apparatus 6 preferably is adapted to activate the voltage regulation unit 4 in response to motion (e.g., motion, vibration, acceleration). The activation apparatus 6 comprises a motion sensor 50 and motion detection circuitry 52. The motion sensor 50 is adapted to detect movement indicative of engine starting and/or indicative of rotation of the generator 10 (i.e., rotation of the field windings 14) and is adapted to provide an output signal OS indicative of the presence of such movement. Conventional vibration sensors and acceleration sensors can be used to implement the motion sensor 50. A typical output signal OS from such a motion sensors 50 is a voltage. That voltage reaches a predetermined level when the motion sensor 50 is subjected to an amount of vibration, acceleration, or other motion that is typically induced by starting of the engine 16 and/or rotation of the generator 10 (i.e., the field windings 14). The activation apparatus 6 responds to this predetermined voltage by sending an activation signal AS to the voltage regulation unit 4.

More specifically, the motion detection circuitry 52 can be connected to the output signal OS from the motion sensor 50. The motion detection circuitry 52 can compare the voltage of the output signal OS from the motion sensor 50 to a reference voltage. The reference voltage can be provided, for example, by voltage-dividing or otherwise suitably tapping the battery voltage on line 40 The reference voltage corresponds to the voltage produced by the motion sensor 50 when the engine 16 is started or running and/or the field winding 14 rotates. When the voltage of the motion sensor's output signal OS reaches or exceeds the reference voltage, the motion detection circuitry 52 responds by applying the activation signal AS to an activation input of the voltage regulation unit 4. The activation signal AS can be applied indirectly (e.g., via strobing circuitry 54 to be described hereinafter) or directly to the voltage regulation unit 4 by the motion detection circuitry 52.

The activation input of the voltage regulation unit 4 receives the activation signal AS whenever the output signal OS from the motion sensor 50 indicates that the engine 16 is running or that the generator's field winding 14 is rotating (e.g., when the output signal OS from the motion sensor 50 reaches the predetermined voltage level). Preferably, the motion detection circuitry 52 includes a differential element (e.g., a differential amplifier, a comparator, or the like) adapted to determine whether the output signal OS from the motion sensor 50 has reached the predetermined threshold level (e.g., voltage level).

The motion detection circuitry 52 preferably serves as a buffer for the output signal OS from the motion sensor 50. In particular, it preferably provides the activation signal AS at a relatively constant voltage level when the voltage output from the motion sensor 50 meets or exceeds the predetermined threshold level, regardless of how far above the predetermined threshold level the voltage output from the motion sensor 50 varies.

Strobing circuitry 54 can be provided if strobing of the activation signal AS becomes desirable. Exemplary situations where strobing is desirable include situations where the voltage regulation unit 4 is not equipped with its own strobing circuitry and where the voltage regulation unit 4 and/or transistor 42 are of the type that require a strobed activation signal. The strobing circuitry 54 can be connected to the activation signal AS and arranged so that the activation signal AS is strobed before it is applied, as strobed activation signal SAS, to the activation input of the voltage regulation unit 4.

Figure 2:
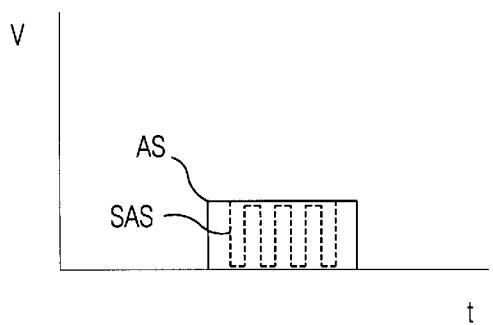
FIG. 2 is a graph of an exemplary activation signal and an exemplary strobed activation signal with respect to time.

In the exemplary arrangement of FIG. 1, and as shown in FIG. 2, the motion detection circuitry 52 buffers the output signal OS from the motion sensor 50 to provide an activation signal AS (shown in solid lines) of relatively constant voltage when the motion indicative of a running engine 16 or field winding rotation is present. The activation signal AS then is cyclically switched on and off by the strobing circuitry 54 so that the voltage regulation unit 4 receives, at its activation input, the strobed version SAS (shown in broken lines) of the activation signal AS. This strobed version SAS of the activation signal AS preferably is used to strobe the transistor 46 and thereby provide enough of a field current in the field winding 14 to commence voltage regulation. The strobed activation signal SAS preferably lasts a predetermined period of time (e.g., between about one second and about two seconds) and is strobed at a predetermined frequency (e.g., between about 200 Hertz and about 400 Hertz). Generally, the combination of the predetermined period of time and frequency of the strobing will be selected to provide a desirable starting current in the field windings 14 of the generator 10. While the ON time and OFF time of the strobed activation signal will vary depending on the type of transistor 42 being used, the desired starting current in the field winding 14, and the like, an exemplary combination of ON and OFF times is an ON time of about 10 milliseconds and an OFF time of about 30 milliseconds.

The motion detection circuitry 52 and/or strobing circuitry 54 can be configured so that the activation signal AS and/or the strobed version SAS, regardless of whether applied directly to the transistor 42, is (are) of limited duration, for example, about 1 second. This may be preferred in situations where the voltage regulation unit 4 is adapted to continue operation on its own after the activation signal has been applied for that limited duration. The limited duration can be controlled by limiting the duration of the activation signal AS at the motion detection circuitry 52, or alternatively, by limiting the duration of the strobed activation signal SAS at the strobing circuitry.

Since the motion sensor 50 triggers the activation signal AS based on vibrations, movement, or acceleration, the activation apparatus 6 advantageously operates independently of residual magnetism in the generator 10. The activation apparatus 6 therefore reliably starts the voltage regulation process even when the residual magnetism of the generator 10 has dissipated or leaked. There is advantageously no need to "flash" the voltage regulation unit 4 after disassembly and reassembly of the generator 10. The activation apparatus 6 also reliably starts the voltage regulation process without requiring an electrical connection from the motion sensor 50 or voltage regulation unit 14, to an ignition switch.

The illustrated activation apparatus 6 advantageously provides a method for motion-based activation of the voltage regulation unit 4. The method comprises the steps of detecting whether a movement indicative of engine starting or generator rotation is present, and applying the activation signal AS (or the strobed version thereof SAS) to the voltage regulation unit 4 when that movement is present during the detecting step. Preferably, the method includes the step of determining whether a signal indicative of that movement (e.g., signal OS) has reached a predetermined threshold level and applying the activation signal AS only when that predetermined level has been reached. The method also can include the step of strobing the activation signal AS, as indicated above. The detection step of the method can be performed by detecting vibrations of an engine or a generator. Alternatively, it can be performed by detecting acceleration of an engine component. As indicated above, the method preferably is performed independently of residual magnetism in the generator 10 and/or independently of an electrical connection to an ignition switch.

Since, as indicated above, the activation apparatus 6 can be integrated into a voltage regulator 60, the present invention also provides a self-activating voltage regulator 60 that responds to motion, vibration, and/or acceleration indicative of engine starting and/or generator rotation. The self-activating voltage regulator 60 includes the voltage regulation unit 4 shown in FIG. 1 and the activation apparatus 6. The voltage regulation unit 4 is adapted to control a field current of the generator 10 and has an activation input adapted to receive an activation signal AS to activate the voltage regulation unit 4 in response thereto. The activation apparatus 6, as indicated above, is adapted to activate the voltage regulation unit 4 in response to movement (e.g., motion, vibration, and/or acceleration) by applying the activation signal AS to the activation input whenever that movement indicates that the engine has been or is being started and/or indicates that the generator 10 (e.g., the field winding 14 of the generator 10) is rotating.

Since the self-activating voltage regulator 60 defined by voltage regulation unit 4 and activation apparatus 6 can be incorporated conveniently into an existing generator 10, without requiring any electrical connection that is not already required by the generator 10 itself, the self-activating voltage regulator 60 advantageously can have its internal components and internal electrical connections protected from exposure or damage. This, in turn, provides a more reliable overall charging system/voltage regulating arrangement when compared to arrangements that have external components and rely on external electrical connections.

Notably, even if the motion sensor 50, strobing circuitry 54, and/or motion detection circuitry 52 require a source of power, this source of power can be derived internally from the battery voltage and electrical ground that are already present at the generator 10 and at the typical voltage regulation unit 4. The voltage regulation unit 4 and activation apparatus 6 therefore can be mounted to the generator

10 in such a way that all electrical connections specific to the voltage regulation unit 4 and activation apparatus 6 are located at the generator 10, and none of those electrical connections require wiring to components outside of the generator 10 and/or charging system 2.

While the present invention has been described with reference to certain preferred embodiments and implementations, it is understood that various modifications and variations will no doubt occur to those skilled in the art to which this invention pertains. These and all other such variations which basically rely of the teachings through which this disclosure has advanced the art are properly considered within the scope of this invention.

What is claimed is:

1. A voltage regulator comprising:
    a voltage regulation unit adapted to control a field current of a current generator, the voltage regulation unit having an activation input adapted to receive an activation signal to activate the voltage regulation unit in response thereto; and
    an activation apparatus adapted to activate the voltage regulation unit in response to motion, by applying said activation signal to the activation input whenever movement indicative of engine starting or indicative of rotation of a generator is present.

2. The voltage regulator of claim 1, wherein said activation apparatus includes:
    a motion sensor adapted to detect said movement and adapted to provide an output signal indicative of the presence of such movement; and
    motion detection circuitry connected to the output signal from the motion sensor and adapted to apply said activation signal to the activation input of the voltage regulation unit whenever the output signal from the motion sensor indicates the presence of said movement.

3. The voltage regulator of claim 2, wherein said motion detection circuitry includes a differential element adapted to determine whether said output signal has reached a predetermined threshold level associated with said movement, so that said activation signal is applied to the activation input only when the predetermined threshold level is reached.

4. The voltage regulator of claim 1, further comprising strobing circuitry connected to said activation signal so that said activation signal is strobed when it is applied to the activation input of the voltage regulation unit.

5. The voltage regulator of claim 1, wherein said activation apparatus includes a vibration sensor that detects said movement.

6. The voltage regulator of claim 1, wherein said activation apparatus includes an acceleration sensor that detects said movement.

7. The voltage regulator of claim 1, wherein said activation apparatus operates independently of residual magnetism.

8. The voltage regulator of claim 1, wherein said activation apparatus is adapted to detect said movement without requiring an electrical connection from the activation apparatus to an ignition switch.

* * * * *